Dec. 15, 1936.  J. F. FRESE  2,064,303
CONTROL SYSTEM FOR ELECTRIC MOTORS
Filed Jan. 4, 1936
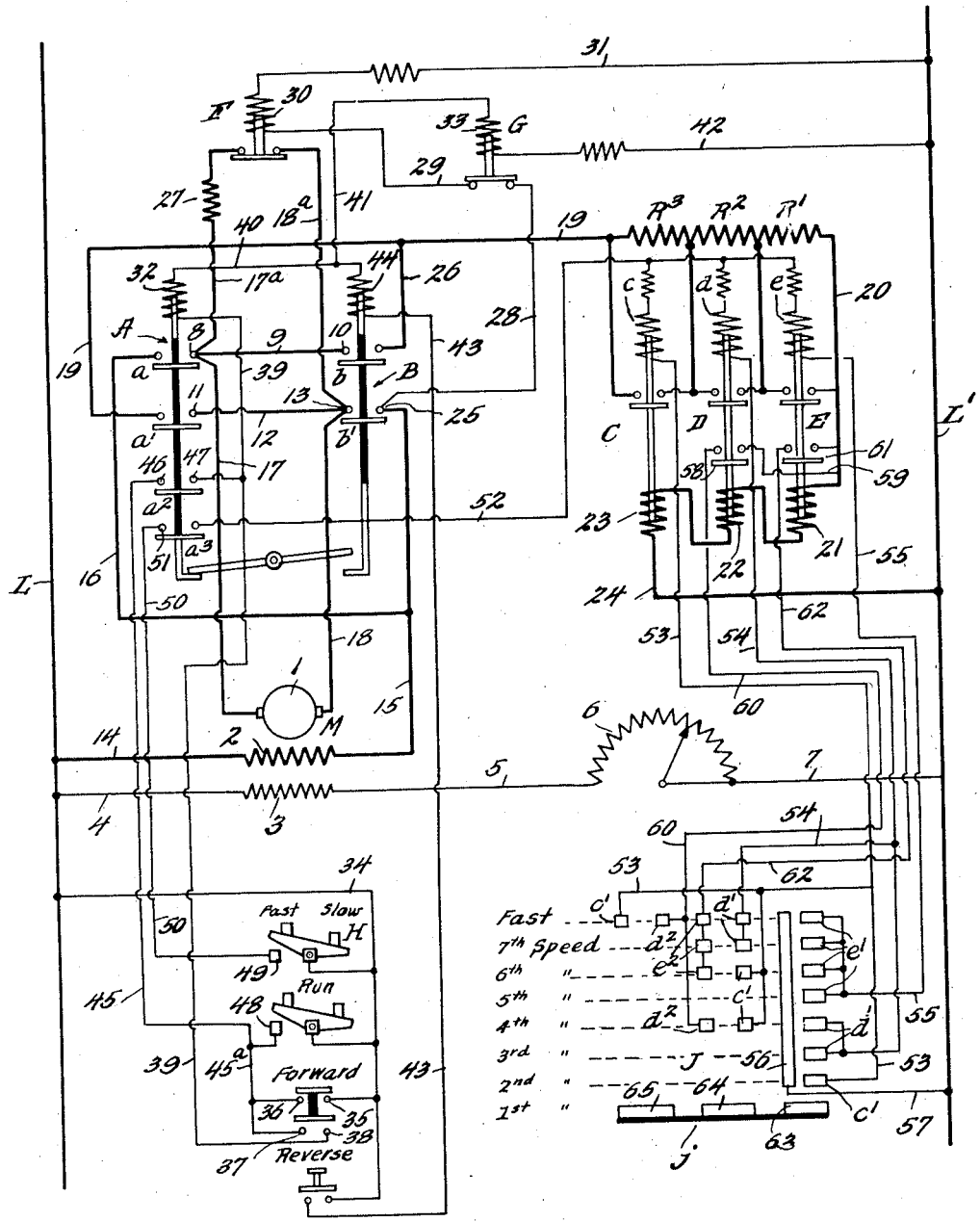
Joseph F. Frese Inventor
By Robert Watson Attorney Patented Dec. 15, 1936

2,064,303

UNITED STATES PATENT OFFICE 2,064,303

CONTROL SYSTEM FOR ELECTRIC MOTORS

Joseph F. Frese, Baltimore, Md., assignor to Monitor Controller Company, Baltimore, Md., a corporation of Maryland Application January 4, 1936, Serial No. 57,610

6 Claims. (Cl. 172—179)

This invention relates to a control system for direct current electric motors used for operating printing presses. For this work it is necessary to provide means for operating the motor slowly in both directions of rotation to jog the press forwardly or backwardly, and also to provide means for operating the motor to drive the press continuously in the forward direction and at various speeds. The invention embodies forward and reverse contactors for connecting the motor to the supply circuit, with novel means for controlling the contactors and the dynamic brake circuit. For controlling the speed of the motor, I provide a series of contactors each adapted to control a section of the resistance in the armature circuit of the motor and each having an energizing coil and a retarding coil, the latter being in the armature circuit, and certain of the contactors having interlocking switches for connecting the energizing coils of the other contactors to the supply circuit. A pre-set speed switch is provided for connecting the individual energizing coils of the speed controlling contactors to the supply circuit and for connecting the energizing coil of each contactor to the supply circuit through the interlocking switch of another contactor, whereby when more than one contactor is operated they will operate in sequence to cut out sections of the resistance and whereby any part or all of the resistance may be cut out or left in circuit to control the speed of the motor.

In the drawing, wherein the invention is shown diagrammatically, M indicates a direct current electric motor comprising the armature 1, series field winding 2 and shunt field winding 3, and L, L' indicate the supply wires leading from a current source. The shunt field circuit extends from supply wire L through conductor 4 to winding 3, thence through conductor 5 to an adjustable field regulating resistance 6 and thence by conductor 7 to supply wire L'. A contactor A is provided for connecting the armature to the supply wires for operation of the motor and its load in the normal or forward direction, and contactor B is provided for reversing the connections to cause the motor to turn backwardly. For closing the armature circuit, the contactor A has two normally open switches a and a', and the contactor B has two normally open switches b and b' for the same purpose. Contact 8 of switch a is connected by conductor 9 to contact 10 of switch b, and contact 11 of switch a' is connected by conductor 12 to contact 13 of switch b'.

When the contactor A is closed, to operate the motor in the forward direction, the armature circuit of the motor is completed as follows: from supply wire L through conductor 14 to the series field winding and by conductors 15 and 16 to switch a, thence by conductor 17 to the armature, thence by conductors 18 and 12 to switch a', thence by conductor 19 to resistance sections R³, R² and R¹ and by conductor 20 to and through lock-out coils 21, 22 and 23 of speed controlling contactors E, D and C, respectively, and thence by conductor 24 to supply wire L'.

When the reverse contactor B is closed, the armature circuit is completed as follows: from supply wire L through conductor 14, series field winding 2 and conductor 15 to contact 25 of switch b', thence to contact 13 and by conductor 18 to the armature of the motor, thence by conductor 17 to contact 8 of switch a and by conductor 9 to contact 10 of switch b and thence through the latter switch to conductor 26, thence by conductor 19 to resistance sections R³, R² and R¹ and by conductor 20 to lock-out coils 21, 22 and 23, and thence by conductor 24 to supply wire L'.

A dynamic brake circuit is connected to the armature terminals through conductors 17 and 18, this circuit comprising the conductor 17ª, brake resistance 27 and conductor 18ª. A contactor F, controlled by relay G, opens this circuit when the actuating coil of either of the contactors A or B is energized and closes the circuit when the actuating coil is de-energized. The circuit for the coil of contactor F is from conductor 15, which is connected to the supply wire L through the series field winding, by conductor 28 to normally closed relay switch G, thence by conductor 29 to coil 30 of contactor F and thence by conductor 31 to supply wire L'. Normally the relay G is closed and hence normally the coil of contactor F is energized and this contactor maintains the dynamic brake circuit closed while the motor is stopped.

To energize the coil 32 of contactor A, a push button switch marked "Forward" is depressed and a circuit through the coil and also through the coil 33 of relay G is completed as follows: from supply wire L through conductor 34 to contacts 35, 36, 37 and 38, thence through conductor 39 to coil 32, thence by conductors 40 and 41 to coil 33 of relay G and thence by conductor 42 to supply wire L'. Upon closure of this circuit, the contactor A will close the armature circuit to start the motor forwardly, the relay G will open the circuit through the coil of contactor F and the latter contactor will open the dynamic brake circuit. Upon release of the "Forward" push button, the circuit through coils 32 and 33 will be broken, contactor A will open the armature circuit, relay G will close the circuit through the coil 30 of contactor F and the latter contactor will close the dynamic brake circuit to brake the motor.

To energize the coil of contactor B, the push button switch marked "Reverse" will be depressed and a circuit will be established as follows: from supply wire L through conductor 34 to the push button switch, thence by conductor 43 to coil 44 of contactor B, thence by conductors 40 and 41 to coil 33 of relay G and thence by conductor 42 to supply wire L'. Upon closure of this circuit, contactor B will close the armature circuit for backward rotation of the motor, relay G will open the circuit of the magnet of contactor F and the latter contactor will open the dynamic brake circuit. When the "Reverse" push button is released, the coils of contactor B and relay G will be de-energized, the contactor will open the armature circuit and the relay will close the circuit through the magnet coil of contactor F and the latter contactor will close the dynamic brake circuit to brake the motor.

The "Reverse" push button switch is used only for operating the motor to jog the press backwardly and the contactor B remains closed only while the switch is held in closed position. In operating the press backwardly, it is desirable that the motor shall operate only at slow speed, and, therefore, all of the regulating resistance remains in the armature circuit, the contactors C, D, and E for controlling this resistance being inoperative. Also, when the "Forward" push button switch alone is depressed, the contactor A will close the armature circuit through all of the resistance, the contactors C, D and E being inoperative, and the motor will operate at slow speed to jog the press forwardly only so long as the push button is depressed.

When it is desired to operate the press continuously in the forward direction, a switch marked "Run" is closed to make up a holding circuit for the coil 32 of contactor A, which holding circuit is completed by the contactor when it closes. This holding circuit extends from supply wire L through conductor 34 to the "Run" switch thence by conductor 45 to stationary contact 46 of a normally open switch $a^2$ operated by the contactor A, thence to contact 47 which is connected to conductor 39 leading to contactor coil 32. From the coil, the circuit continues through conductors 40, 41, relay coil 33 and conductor 42 to the supply wire L'. The contact 48 of "Run" switch is connected to contact 36 of the "Forward" switch by conductor 45a. With the "Run" switch closed to make up the holding circuit to the switch $a^2$, the momentary depression of the "Forward" switch will complete the circuit to the coil 32 through conductor 39, the contactor A will close the holding circuit at the switch $a^2$, and the motor will continue to operate after the release of the "Forward" switch and until the "Run" switch is opened.

A switch H is provided for making up a circuit to the actuating coils of the speed controlling contactors C, D and E. While this switch is open, these contactors are inoperative to cut resistance out of the armature circuit. When this switch is closed, a circuit is made up to said actuating coils as follows: from supply wire L through conductor 34 to contact 49 of switch H, thence by conductor 50 to stationary contact 51 of a normally open switch $a^3$ on contractor A, and from said switch, the circuit continues through conductor 52 to the actuating coils c, d and e of contactors C, D and E, in parallel. From coil c, a conductor 53 leads to a plurality of contacts c' on a pre-set speed controlling switch mechanism J. Coil d is connected by conductor 54 to a plurality of contacts d' on the switch mechanism J and coil e is connected by conductor 55 to a plurality of contacts e' on said mechanism. These contacts may be grouped in various combinations by a relatively movable bridging device j adapted to connect some of them to the side L' of the supply circuit through a long metal strip or bus bar 56 and conductor 57, and others through interlocking connections controlled by contactors D and E.

The contactor D controls a normally open interlock switch 58 and when this contactor closes to cut out the resistance section $R^2$, it also closes the switch 58 and thereby connects contacts $d^2$ on the pre-setting switch with the side L' of the supply circuit as follows: from L' through conductor 24 and lock-out coils 23, 22 and 21 to conductor 20, thence through conductor 59 to switch 58, thence by conductor 60 to the contacts $d^2$. The contactor E controls a normally open interlock switch 61 and when this contactor closes to cut out resistance section $R^1$, it closes switch 61 and thereby connects a series of contacts $e^2$ on the pre-setting switch to the side L' of the supply circuit through conductor 24 and the lock-out magnet coils 23, 22 and 21, thence through switch 61 and conductor 62 to the contacts $e^2$.

To operate the motor forwardly continuously under the control of the speed contactors C, D and E and the pre-set speed regulating switch mechanism, the switch H is closed to make up the circuit to the normally open switch $a^3$ on contactor A and the coils of the speed contactors, and the "run" switch is closed to make up the holding circuit of coil 32 of contactor A to the normally open switch $a^2$ on said contactor, and the "forward" push button is then momentarily closed to energize the coil 32. The contactor A then closes the motor circuit and simultaneously closes the holding circuit at the switch $a^2$ and the circuit to the coils of the speed contactors at the switch $a^3$. The motor will then operate at a speed determined by the setting of the member j of the pre-set speed regulating mechanism J.

The bridging device j has three alined contact members or bridge pieces 63, 64 and 65. If this device is in the first or low speed position, as shown in the drawing, when the armature circuit is closed, no one of the contacts connected to the energizing coils of the speed controlling contactors will be engaged and the motor will operate at its slowest speed, with all of the resistance in the armature circuit.

The resistance of the sections $R^3$, $R^2$ and $R^1$ increases geometrically, the resistance of section $R^2$ being twice that of section $R^3$ and the resistance of section $R^1$ being twice that of section $R^2$.

If the bridging device is set in the second speed position, the contact member 63 will connect a contact c' to the bus bar and thence to the supply wire L' and complete the circuit through the energizing coil c of contactor C. This coil is opposed by the lock-out coil 23 in the armature circuit, and when the current in said circuit falls to a pre-determined value, the contactor will close and cut out the resistance section $R^3$, leaving sections $R^2$ and $R^1$ in the circuit.

If the bridging device is in the third speed position when the armature circuit is closed, the contact member 63 will connect a contact d' to the bus bar and thence to supply wire L' and complete the circuit of the energizing coil d of contactor D. This contactor will close when the current in the lock out coil 22 falls to a pre-determined value and section $R^2$ of the resistance will be cut out of the armature circuit, leaving sections $R^3$ and $R^1$ in the circuit.

If the bridging device is set in the fourth speed position, the contact member 63 will connect a terminal d' of the energizing coil of contactor D to the side L' of the supply circuit through the bus bar and conductor 57, and the contact member 64 will connect a terminal c' of the energizing coil of contactor C to a contact $d^2$ which is connected through conductor 60 to switch 58 of contactor D. Contactor D will close when the current in lock-out coil 22 falls to a pre-determined value, cutting out the resistance section $R^2$, and switch 58 will close completing the circuit of the coil c of contactor C through conductors 59 and 60, bridge piece 64 and conductor 53. Contactor C will then close when the current in the lock-out coil 23 permits. The motor will then operate with only the resistance section $R^1$ in the armature circuit.

If the bridging device is set in the fifth speed position, its contact member 63 will connect a terminal e' of the energizing coil of contactor E to supply wire L' through the bus bar, and contactor E will close when the current in its lock-out coil 21 permits. In this position of the bridging device, the resistance section $R^1$ will be cut out of the armature circuit and the sections $R^2$ and $R^3$ will remain in the circuit.

In the sixth speed position of the bridging device, contact member 63 will connect a terminal e' of the coil of contactor E to supply wire L' and bridge piece 64 will connect a terminal c' of the energizing coil of contactor C to a contact $e^2$ which is connected by conductor 62 to a contact on the switch 61 which is controlled by contactor E. Contactor E will first close, when the current in its lock-out coil 21 permits, cutting out resistance section $R^1$, and the switch 61 will complete the circuit to energizing coil of contactor C through conductors 62 and 53. Contactor C will then close, cutting out resistance section $R^3$, and the motor will operate with the resistance section $R^2$ in the armature circuit.

In the seventh speed position of the bridging device, its contact member 63 will connect a terminal e' of the energizing coil of contactor E to the side L' of the supply circuit through the bus bar, and the contact member 64 will connect a terminal d' of the energizing coil of contactor D to a terminal $e^2$ which is connected to the switch 61 controlled by contactor E. Contactor E will first close, cutting out resistance section $R^1$, and the switch 61 will complete the circuit of the coil d of the contactor D, and the latter will then close, cutting out resistance section $R^2$, and the motor will then operate with the resistance section $R^3$ in its armature circuit.

In the eighth or fast speed position of the bridging device, the bridge piece 63 connects a terminal e' of the energizing coil of contactor E to supply wire L' through the bus bar; bridge piece 64 connects a terminal d' of the energizing coil of contactor D to a contact $e^2$ connected by conductor 62 to switch 61 of contactor E, and bridge piece 65 connects a terminal c' of the energizing coil of contactor C to a contact $d^2$ connected by conductor 60 to the switch 58 controlled by contactor D. Contactor E will first close, retarded by its lock-out coil, cutting out the section $R^1$ of the resistance and closing switch 61. This switch will close the circuit to the energizing coil d of contactor D through conductor 62, bridge piece 64 and conductor 54. Contactor D will then close, retarded by its lock-out coil 22, cutting out resistance $R^2$ and closing switch 58. The closure of switch 58 completes the circuit to energizing coil c of contactor C through conductor 60, bridge piece 65 and conductor 53. Contactor C then closes, cutting out resistance section $R^3$. The motor will then operate at full speed with all of the resistance out of the armature circuit.

Thus, in all cases where more than one of the contactors operate, they will operate in sequence.

What I claim is:

1. In a control system for electric motors, a supply circuit, a motor, two normally open contactors, one for closing the armature circuit for operation of the motor in one direction and the other for closing said circuit for operation of the motor in the reverse direction, circuits and switches for controlling said contactors independently, a dynamic brake circuit, a relay having a coil connected to the supply circuit and normally closing the dynamic brake circuit when the motor is stopped, said relay adapted to open the brake circuit when its coil is de-energized, and a second relay normally closing the circuit of said first mentioned relay, said second relay having its coil connected in the control circuits of said contactors and adapted to open the circuit of the coil of the first mentioned relay, to de-energize the same, when either of said control circuits is closed.

2. In a control system for electric motors, a supply circuit, a motor, a resistance in the armature circuit of the motor, a plurality of normally open contactors for cutting out said resistance, each of said contactors having an energizing coil, a normally open main contactor for connecting the motor to the supply circuit, a circuit for connecting the energizing coils of said first mentioned contactors to one side of the supply circuit including two switches in series, one of said switches being controlled by the main contactor and the other switch being manually operable, and a pre-set speed controlling device for connecting said energizing coils in various groupings to the other side of the supply circuit.

3. In a control system for electric motors, a supply circuit, a motor, a resistance in the armature circuit of the motor, a plurality of normally open contactors for cutting out said resistance, each of said contactors having an energizing coil for closing the contactor and a coil in series with the armature for retarding the contactor, a normally open main contactor for connecting the motor to the supply circuit, a circuit for connecting the energizing coils of said first mentioned contactors to one side of the supply circuit including two switches in series, one of said switches being controlled by the main contactor and the other switch being manually operable, and a pre-set speed controlling device for connecting said energizing coils in various groupings to the other side of the supply circuit.

4. In a control system for electric motors, a supply circuit, a motor, a resistance in the armature circuit of the motor, a plurality of contactors for cutting out said resistance, each of said contactors having an energizing coil and certain of said contactors having normally open interlock switches for connecting the energizing coils of other of said contactors to one side of said supply circuit, a pre-set speed switch having means for connecting the energizing coils of said contactors individually to the aforesaid side of the supply circuit and also having means for connecting the energizing coil of each contactor to the interlock switch of another of said contactors, a main contactor for closing the armature circuit of the motor and a switch controlled by the latter contactor for connecting said energizing coils to the other side of the supply circuit when the main contactor closes.

5. In a control system for electric motors, a supply circuit, a motor, a resistance in the armature circuit of the motor, a plurality of contactors for cutting out said resistance, each of said contactors having an energizing coil and a retarding coil, the latter in the armature circuit, and certain of said contactors having normally open interlock switches for connecting the energizing coils of other of said contactors to one side of said supply circuit, a pre-set speed switch having means for connecting the energizing coils of said contactors individually to the aforesaid side of the supply circuit and also having means for connecting the energizing coil of each contactor to the interlock switch of another of said contactors, a main contactor for closing the armature circuit of the motor and a switch controlled by the latter contactor for connecting said energizing coils to the other side of the supply circuit when the main contactor closes.

6. In a control system for electric motors, a supply circuit, a motor, a resistance in the armature circuit of the motor, a plurality of contactors for cutting out said resistance, each of said contactors having an energizing coil and retarding means and certain of said contactors having normally open interlock switches for connecting the energizing coils of other of said contactors to one side of the supply circuit, a pre-set speed switch having contacts connected to the several energizing coils and contacts connected to the several interlock switches and a bridging device adjustable relatively to said contacts, said device adapted, in successive positions, to connect the energizing coils individually to the aforesaid side of the supply circuit and in certain of said positions to connect one or more of said coils to the interlock switch or switches of other contactors, a main contactor for closing the armature circuit of the motor, and a switch controlled by the latter contactor for connecting said energizing coils to the other side of the supply circuit when the main contactor closes.

JOSEPH F. FRESE